Aug. 30, 1927. 1,640,772
T. A. HIBBINS
GRINDING PAN FOR GRINDING MACHINES FOR GRINDING CLAYS,
SHALES, AND OTHER DRY AND SEMIDRY MATERIALS
Filed March 20, 1925 2 Sheets-Sheet 1
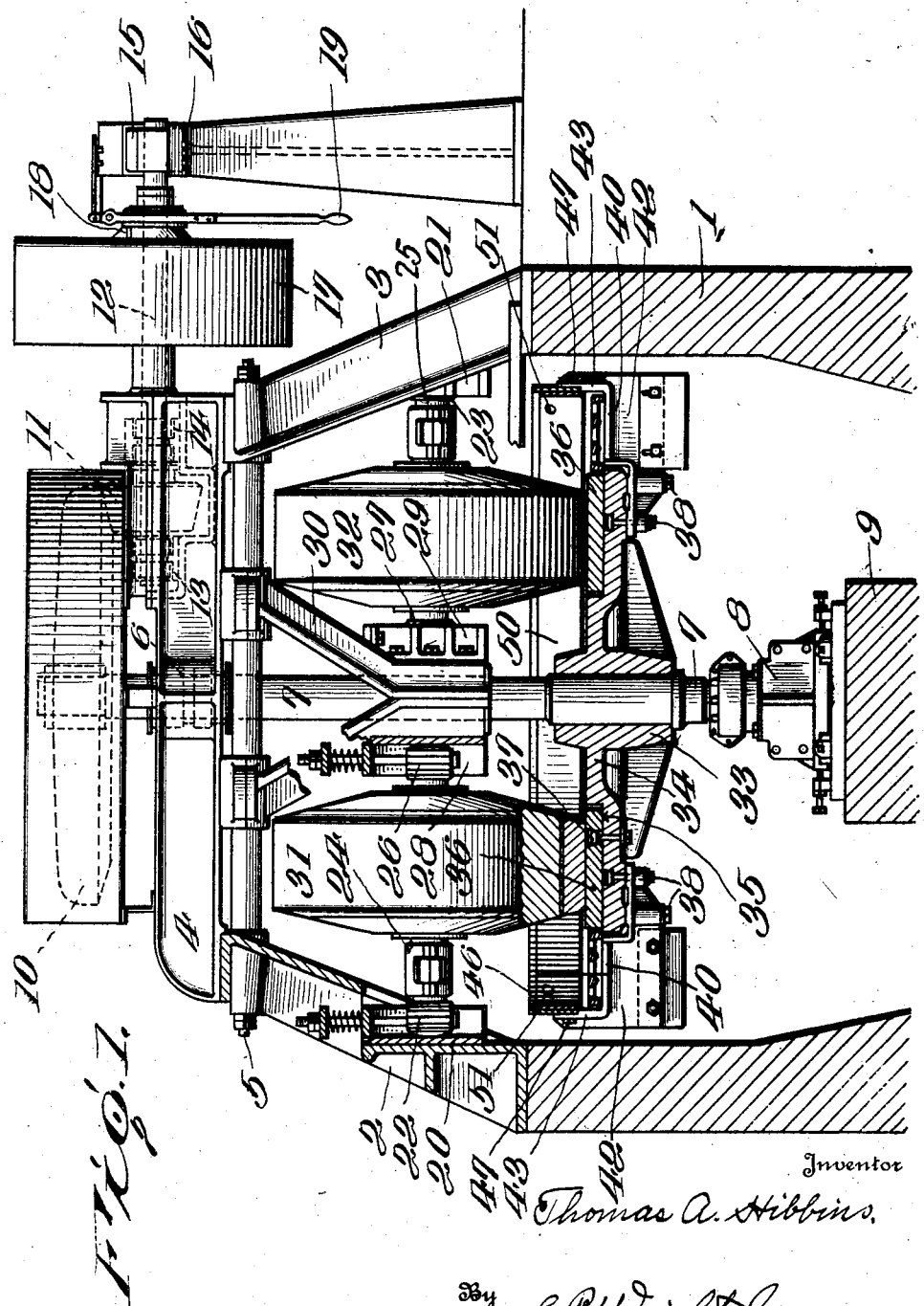
Inventor
Thomas A. Hibbins,
By C. R. Wright, Jr.
Attorney

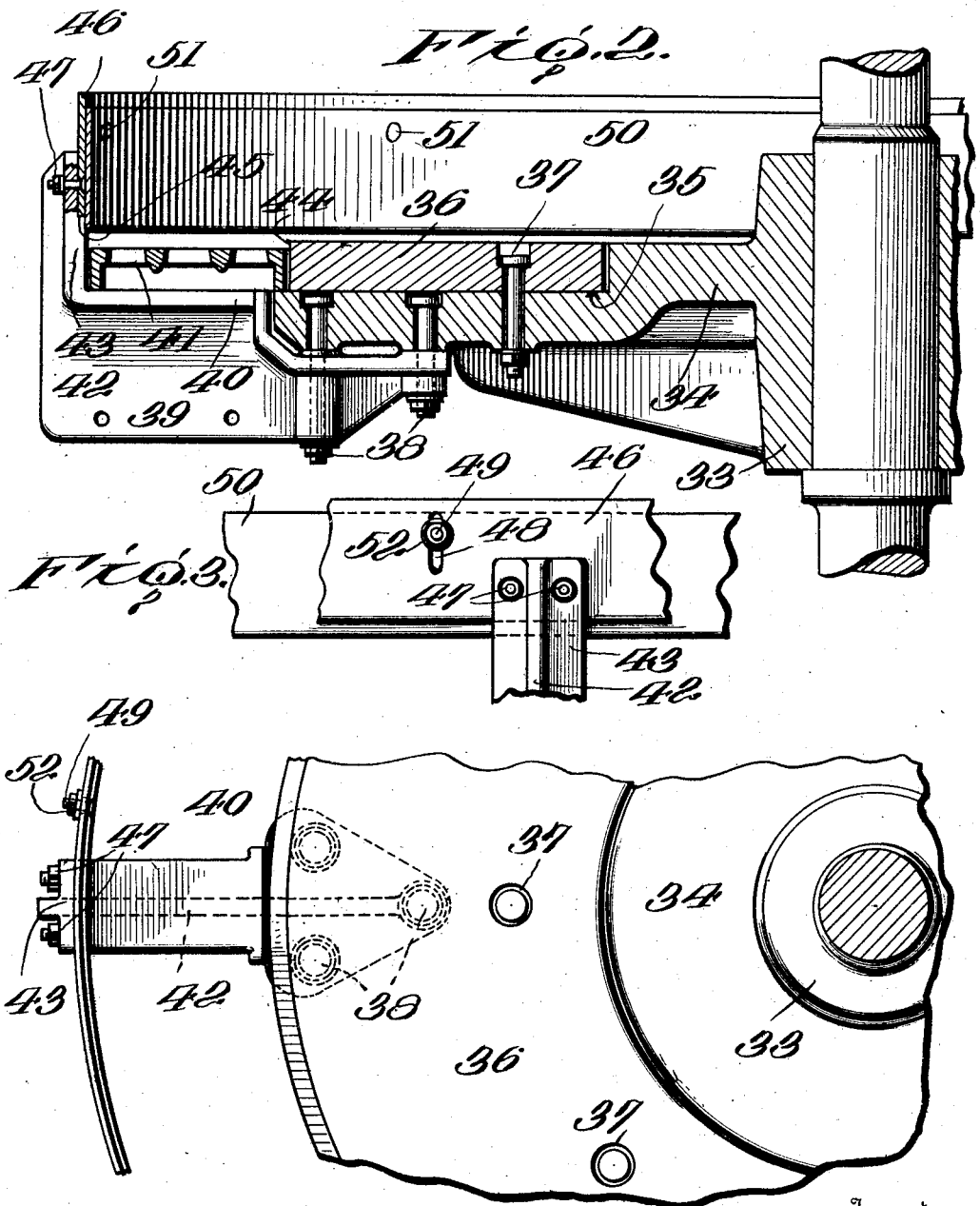

Patented Aug. 30, 1927.

1,640,772

UNITED STATES PATENT OFFICE.

THOMAS A. HIBBINS, OF WELLSVILLE, OHIO, ASSIGNOR TO STEVENSON COMPANY, OF WELLSVILLE, OHIO.

GRINDING PAN FOR GRINDING MACHINES FOR GRINDING CLAYS, SHALES, AND OTHER DRY AND SEMIDRY MATERIALS.

Application filed March 20, 1925. Serial No. 16,993.

My invention relates to improvements in grinding pans for grinding machines for grinding clays, shales, and other dry and semi-dry materials.

The object of my invention is to provide a grinding pan with means for supporting a rim on its outer periphery, and having a vertical adjustable liner carried by the rim, whereby the same can be adjusted vertically for varying the distance between the lower edge of the liner and the pan, so that the spillway can be changed so that the size of the material discharged from the spillway can be changed to meet the conditions for which the material to be ground is to be used.

Another object of my invention is to provide a pan of this character in which the rim supporting brackets also serve as means for supporting the screen arranged between the outer face of the grinding pan and the lower edge of the rim, whereby the rim, the screen or the grinding ring can be readily removed and replaced at will, when worn or otherwise injured.

A further object of my invention is to provide a rim carried by and rotated with the grinding pan, so that there will be no friction between the material on the grinding pan and the rim, as the same rotates therewith, and also providing a liner with a smooth inner face so that the material will not be interfered with and will be thrown back on the grinding plate under the mullers.

A still further object of my invention is to provide a simple, cheap and effective grinding pan of this character adapted to be used in combination with any type of mullers and having certain details of structure and combination of parts hereinafter more fully set forth.

In the accompanying drawings:—

Figure 1 is a side elevation partly in section of a grinding machine showing my improved grinding pan applied thereto.

Figure 2 is an enlarged transverse sectional view of one side of the pan showing the rim and the adjustable liner.

Figure 3 is an edge view showing one of the rim supporting brackets, and the means of adjustably holding the liner to the rim.

Figure 4 is a top plan view of a portion of the pan showing one of the supporting brackets and the adjustable holding means for the liner.

Referring now to the drawings, 1 represents the base which is preferably made of concrete, and upon which are mounted the two metal frames 2 and 3, braced at their upper ends by the transverse frame 4, clamped thereon by means of bolts 5, all of which will be more fully shown and described, in my co-pending application Ser. No. 25,885, filed April 25, 1925, as this frame forms no part of this invention. The transverse frame 4, at the center is provided with a bearing 6, in which is rotatably mounted a vertically disposed shaft 7, having its lower end mounted in the combination roller and thrust bearing 8, mounted upon the cement base 9. This vertically disposed shaft 7 carries at its upper end, a ring gear 10, meshing with the pinion gear 11, keyed on the shaft 12. This pinion gear 11 is arranged between the two bearings 13 and 14, supporting the shaft 12. The shaft 12 has its outer end mounted in the bearing 15, carried in the support 16, and said shaft is provided with a drive pulley 17, loosely mounted thereon and connected thereto by means of the clutch 18, operated through the clutch lever 19. This structure is shown to illustrate an operative grinding machine and forms a part of the hereinbefore mentioned application to be later filed. The frames 2 and 3 are provided with guide ways 20 and 21, in which are vertically movable mounted boxing 22 and 23, carrying the shafts 24 and 25. The inner ends of the shafts are carried by the downwardly disposed frame 30, carried by the transverse frame 4. Mounted on the shafts 24 and 25 are the mullers 31 and 32 having bearing or roller connections with the shafts, all of which is well understood and needs no further description.

The vertical shaft 7 has rigidly secured thereon, adjacent its lower end, a hub 33, which is formed integral with the grinding pan 34, said grinding pan 34, as is well understood, is of a circular form and of a diameter to extend out beyond the outer edges of the mullers 31 and 32. The upper face of the pan, adjacent its outer edge, is provided with an annular recess 35 in which is bolted the grinding ring 36, which is of a width greater than that of the mullers and of a thickness equal to the depth of the recess so that the upper face of the pan and the grinding ring are in a horizontal plane, and said grinding ring 36 is bolted upon the pan by means of bolts 37, all of which is clearly shown in Figures 1 and 2.

Secured to the lower face of the pan, by means of three bolts 38, are eight outwardly extending brackets 39 of a shape to conform with the outer edge of the pan, and having a flat horizontal portion 40 adapted to support the screen 41, and strengthen by means of the web 42 which extends upwardly around the vertical portion 43, carried by the outer edge of the flat horizontal portion 40. Thus, it will be seen that the screen 41 rests upon the flat horizontal portion 40, between the outer periphery 44 of the grinding ring 36, and the vertical portion 43 of the bracket. While I have described eight of these brackets it will be understood that any desired number can be used according to the character of work for which the machine is designed. The inner faces of the vertical portions 43 of the brackets are provided with recesses 45 which are adapted to receive the rim 46, which is bolted thereto by means of bolts 47. The rim 46, at different points, around the periphery, is provided with the slots 48, through which the bolts 49 pass, and arranged on the inner face of the rim, is the liner 50 which has openings arranged therein through which the bolts 49 pass. The heads 51 of the bolts are counter sunk in the liner so that their inner faces are flush with the inner face of the liner, as clearly shown in Figure 4 of the drawings. Screwed on the bolts 49 on the outside of the rim 46, are the nuts 52, by means of which the liner is firmly clamped to the inner face of the rim 46 in its adjusted position, the bolts 48 being free to move vertically in the slots 48 when the nuts 52 are loosened, whereby the spillway between the edge of the screen 41 and the lower edge of the liner may be varied according to the character of work the machine is to perform.

By this structure it will be seen that the liner takes care of all of the wear caused by the clay being thrown outwardly by force against the same, and it is an easy matter to replace the liner, and said liner also has a perfectly smooth inner face so not to interfere with the material as it is thrown outwardly by force against the same. While I have shown a liner for the rim, it will be understood that the rim could be vertically adjustably supported by the brackets and perform the same function as the liner for varying the size of the spillway, without departing from my invention.

Having thus fully described my invention what I claim is:—

1. A grinding pan of the character described, comprising a flat horizontal rotating grinding surface, and an adjustable rim carried thereby on its outer edge for controlling the size of the spill way between the rim and the grinding face.

2. A grinding pan of the character described comprising a flat horizontal rotating grinding surface, a vertically disposed plate carried by the pan, and a vertically adjustable rim carried by the plate and controlling the size of the spill way between the rim and the grinding face.

3. A grinding pan of the character described comprising a flat horizontal rotating grinding surface, brackets carried by the grinding pan and having a vertically adjustable circular plate controlling the spillway from the grinding pan.

4. A grinding pan comprising a rotatable horizontal flat grinding surface, brackets carried by the grinding pan and supporting a rim, and an adjustable liner carried by the rim.

5. A grinding pan comprising a flat rotating grinding surface, brackets carried thereby and extending upwardly above the grinding face of the pan, a rim carried by the brackets, and a vertically adjustable liner protecting the rim and controlling the size of the spillway from the grinding pan.

6. A grinding pan comprising a flat rotating grinding surface, brackets carried by the grinding pan, and a vertically adjustable plate carried by the brackets for controlling the size of the spillway from the grinding pan.

7. A grinding pan comprising a flat horizontal grinding surface, and a vertically disposed adjustable plate carried by the outer edge of the pan for controlling the size of the spillway.

8. A grinding pan comprising a flat horizontal surface, a vertically adjustable plate carried by the pan beyond the outer edge thereof, for controlling the size of the spillway.

9. A grinding pan comprising a flat horizontal surface, a screen surrounding the outer edge of the pan, and a vertically disposed adjustable plate carried by the pan for controlling the size of the spillway between the screen and the plate.

10. A grinding pan of the character described comprising a flat horizontal rotating grinding surface, brackets carried by the grinding pan, a screen supported by the brackets, a vertically disposed adjustable plate carried by the pan for controlling the size of the spillway between the screen and the plate.

11. A grinding pan of the character described comprising a flat horizontal rotating grinding surface, brackets carried by the lower face of the grinding pan and extending out beyond the periphery thereof, and a vertically disposed adjustable plate carried by the brackets for controlling the size of the spillway from the pan.

12. A grinding pan of the character described comprising a flat horizontal rotating grinding surface, brackets carried by the pan, a screen carried by the brackets and surrounding the outer periphery of the pan, a rim rigidly carried by the brackets, and a vertically adjustable liner carried by the rim for controlling the size of the spillway from the grinding pan.

13. A grinding pan comprising a flat horizontal grinding surface, brackets carried by the pan extending outwardly beyond the same, a screen supported by the brackets in a horizontal plane, and an adjustable plate carried by the brackets for controlling the size of the spillway at the outer edge of the screen.

14. A grinding pan comprising a flat horizontal rotating grinding surface, brackets carried by the pan and extending outwardly beyond the periphery thereof, a screen carried by the brackets and surrounding the pan in a plane slightly below or on same plane as the pan, a rim rigidly carried by the brackets, and a vertically adjustable liner carried by the rim for controlling the size of the spillway from the grinding pan.

15. A grinding pan comprising a flat rotating grinding surface, brackets carried by the lower face thereof, a screen carried by the brackets and surrounding the pan, and in a plane slightly below or level with the pan, a rim rigidly carried by the brackets above the plane of the pan, and a vertically adjustable liner carried by the rim and controlling the size of the spillway from the screen.

16. A grinding pan comprising a flat horizontal rotating grinding surface, brackets carried by the pan, a rim rigidly carried by the brackets and having its lower edge in a plane above the plane of the pan, and a liner having bolts, the heads countersunk within the inner face of the liner, and passing through slots in the rim, whereby the liner can be adjusted vertically for controlling the size of the spillway from the pan.

17. A grinding pan comprising a flat rotating grinding surface, brackets carried by the pan having vertically disposed outer ends, a rim rigidly carried by the outer faces of the vertically disposed ends of the brackets, and a liner vertically adjustably supported by the inner face of the rim for controlling the size of the spillway from the grinding pan.

18. A grinding pan comprising a flat horizontal member having a ring like grinding surface removably attached thereto, brackets bolted to the member below the grinding ring, and extending outwardly beyond the same, and having vertically disposed outer ends, a screen resting upon the brackets, and the member on the outside of the ring, a rim rigidly secured to the inner faces of the vertically disposed ends of the brackets, and a liner carrying bolts passing through vertical slots in the rim, whereby the liner can be vertically adjusted for controlling the size of the spillway from the pan.

In testimony whereof, I have signed this specification.

THOMAS A. HIBBINS.